United States Patent [19]
Difrancesco

[11] Patent Number: 5,815,202
[45] Date of Patent: Sep. 29, 1998

[54] METHOD AND APPARATUS FOR SCANNING AN IMAGE USING A MOVING LENS SYSTEM

[75] Inventor: David Difrancesco, San Francisco, Calif.

[73] Assignee: Pixar, Richmond, Calif.

[21] Appl. No.: 664,266

[22] Filed: Jun. 11, 1996

[51] Int. Cl.⁶ .................................................. H04N 7/18
[52] U.S. Cl. ............................. 348/97; 348/97; 348/98; 348/110; 348/111
[58] Field of Search .............................. 348/97, 98, 102, 348/103, 109, 110, 112

[56] References Cited

U.S. PATENT DOCUMENTS

| | | |
|---|---|---|
| 4,205,337 | 5/1980 | Milward . |
| 4,255,764 | 3/1981 | Howe . |
| 4,319,280 | 3/1982 | Roos et al. . |
| 4,330,793 | 5/1982 | Stemme et al. . |
| 4,485,406 | 11/1984 | Brownstein ............................. 348/98 |
| 4,639,787 | 1/1987 | Isogai et al. ............................. 348/97 |
| 4,729,015 | 3/1988 | Wagensonner . |
| 4,821,073 | 4/1989 | Backus et al. .......................... 348/110 |
| 4,920,419 | 4/1990 | Easterly ................................... 348/97 |
| 5,067,020 | 11/1991 | Funston .................................. 358/214 |
| 5,165,068 | 11/1992 | Baldwin .................................. 358/214 |
| 5,249,056 | 9/1993 | Foung et al. . |
| 5,519,442 | 5/1996 | Asami et al. .......................... 348/375 |
| 5,568,273 | 10/1996 | Sato et al. .............................. 358/451 |

FOREIGN PATENT DOCUMENTS

| | | |
|---|---|---|
| 498945 | 1/1939 | United Kingdom . |
| 2011756 | 7/1979 | United Kingdom . |
| 2025731 | 1/1980 | United Kingdom . |

OTHER PUBLICATIONS

Davis, Mike et al., *High Resolution CCD Film Scanner for Special Effects Applications*, (Industrial Light and Magic, 1991).

*Primary Examiner*—Amelia Au
*Assistant Examiner*—Anand S. Rao
*Attorney, Agent, or Firm*—Hecker & Harriman

[57] ABSTRACT

A method and apparatus for scanning an image using a moving lens scanning system is described. The present invention moves film through a pin registered film gate, creating a projected image. A light source exposes images on the film in the film gate. The projected image passes through a lens and exposes a sensor, for example, a CCD camera. The sensor converts the section of the projected image exposed to it into electronic signals, and transfers that data out of the sensor. In one embodiment, the position of the film gate relative to the lens and sensor is adjustable to accommodate different size film formats. A rectangular sensor is used having a width narrower than the projected image width, and a height corresponding to the height of the projected image. To expose an entire film frame image to the sensor, the lens moves along an axis parallel to the width of the film frame so as to move the projected image across the sensor at a predetermined rate sufficient to allow the sensor to capture each component of the projected image. The present invention thereby scans film images using a sensor substantially smaller than the projected image size, and can scan a variety of film formats without moving or changing the size of the sensor.

18 Claims, 4 Drawing Sheets

METHOD AND APPARATUS FOR SCANNING AN IMAGE USING A MOVING LENS SYSTEM

BACKGROUND OF THE INVENTION

1. Field of the Invention

The present invention relates to the field of film scanners.

2. Background Art

Film scanners are sometimes used to convert motion picture film into analog television signals for broadcasts. In such film scanning apparatus, a film frame is scanned in a direction generally perpendicular to the length of the film at a standard television line rate. Scanners have also been developed to digitize films for storage and processing in a digital form. Storing motion picture images in a digital form has many advantages over storing motion picture images using film. These advantages include that digital images can be readily duplicated with no loss of image quality, digital images can be readily enhanced by computers, digital films can be stored indefinitely, and digital films can be distributed electronically.

Film scanners that digitize film may expose an entire film frame onto a sensor. Alternatively film scanners may use a frame scanning mechanism to move film frame images across a sensor. Typically with digital film scanners a film frame image is exposed by several colored light sources. For example, an image may be first exposed by a red light source, then a green light source, then a blue light source. In operation, a light source exposes a film frame and projects an image. The projected image passes through a lens and onto a sensor. The sensor then converts the image into data for storage.

A film scanner can be implemented by using a line-array sensor to convert images into electronic signals rather than a full size sensor array. A line-array sensor is a sensor which comprises a group of sensing elements, called pixels, arranged in a column, such that the height of the column corresponds to height of the projected image that is to be digitized. The column may only be one pixel wide, or it may contain a plurality of pixels. This type of sensor uses many times fewer pixels than a full size array that matches the projected image size in height and width. The cost savings of using a line-array sensor is even greater for digitizing motion pictures than converting film images for TV broadcast because of the higher resolution required to store motion pictures. The prior art uses a variety of techniques to allow sensors smaller than the projected image to be used. For convenience a reference direction along the length of the film will be referred to hereinafter as the "vertical" direction and the direction transverse to the length of the film will be referred to as the "horizontal" direction.

In U.S. Pat. No. 4,319,280 Roos et al discloses an apparatus for converting photographic film images into video signals. A film frame is placed in a film gate and is uniformly illuminated. A rotating scanning mirror images one line of the film frame onto a row of radiation sensitive detectors. The scanning mirror rotates about a fixed axis and images the remaining lines of the film frame onto the row of detectors. When the film frame has been entirely scanned, a new film frame is placed in the film gate and the scanning mirror begins to scan the new film frame. In this manner the entire film is scanned.

In U.S. Pat. No. 4,255,764 Howe discloses a film scanner using a CCD line sensor feeding a signal processor to produce television signals from a motion picture film. The scanner includes a multifaceted mirror (shaped like a reflective polygon) that reflects the image of an illuminated film frame onto the CCD line sensor. The multifaceted mirror rotates in order to sweep the entire image of the film frame onto the line sensor. When the mirror completes its rotation, the entire image of the film frame has been, line by line, exposed to the CCD line sensor. This process is repeated for other film frames to convert the entire film into video signals.

In U.S. Pat. No. 4,330,793 and in U.K. Patent Application GB 2 025 731A Stemme et al disclose an apparatus for scanning a motion picture film for conversion into video signals. The apparatus includes a film transport to continuously move the film at a constant speed. The image of each film frame is projected onto a single row of photo diodes. In order to scan the entire film frame, the film frame is transported by the film transport. However, the apparatus also includes a mirror which tilts to aid the scanning of the film frame.

In U.S. Pat. No. 4,729,015 Wagensonner discloses an apparatus for copying an original onto a photosensitive paper. The original is scanned, line by line, onto a CCD array to produce density signals. The scanning is accomplished with the aid of a pivotable mirror. The density signals are used to influence the beam of a CRT or a laser. The CRT beam (or the laser beam) is used to reproduce, line by line, the image of the positive on the photosensitive paper.

In U.K. Patent Application GB 2 011 756A, Zinchuk discloses an apparatus for converting film frame images into video signals. Film frames are continuously advanced to pass before a projection aperture. The image of each film frame is projected onto a rotating reflective drum. The rotating drum sweeps the image of each film frame onto photosensitive elements. The photosensitive elements are sampled to produce video signals corresponding to each film frame.

In U.S. Pat. No. 4,205,337 Millward discloses an apparatus for producing television signals from a photographic film at a scanning station while transporting the film continuously past the scanning station. The scanning frequency can be changed to accommodate for different film speeds, film formats and film sizes. The scan signals are stored in memory and later read to produce television signals.

In U.S. Pat. No. 5,249,056 Foung et al disclose an apparatus for generating video signals from a photographic film. The apparatus includes a film transport for advancing or rewinding the film to position a film frame at a film gate. The apparatus also includes an image projector which detects when a film frame is positioned at the film gate and flashes a strobe light to project an image of that frame. The apparatus also has a video pickup system which receives the projected image and generates video signals corresponding to the image.

In U.K. Patent Specification 498,945 Espley discloses an apparatus that aids in converting a motion picture film into television signals. To accomplish the conversion, the apparatus uses two half-lenses to illuminate a film frame gate.

Film scanners that use a rotating mirror to scan an image must adhere to narrow radiosity constraints, and the precision movement of the mirror requires complex and costly control apparatus and optics. To avoid the complexity, cost, and radiosity constraints of the prior art rotating mirror scanners, a film scanning apparatus is needed that uses a simple image deflection scheme, without requiring a rotating mirror to move the projected image across the sensor.

It is also desirable to make film scanners adjustable to accommodate different film sizes without changing the sensor that converts the projected image into electronic signals. Prior art scanners have used a variety of techniques to maintain the size of the projected image with different film sizes including moving the sensor. A film scanner is needed that can accommodate different film sizes without requiring changing the sensor.

SUMMARY OF THE INVENTION

The present invention relates to a method and apparatus for scanning an image using a moving lens scanning system. The present invention moves film through a pin registered film gate, creating a projected image. A light source exposes images on the film in the gate. The projected image passes through a lens and exposes a sensor, for example, a CCD camera. The sensor converts the component of the image exposed to it into electronic signals, and transfers that data out of the sensor. In one embodiment, the position of the film gate relative to the sensor is adjustable to accommodate different size film formats. Changing the position of the film gate in this manner changes the size of the projected image at the image plane of the sensor.

An embodiment of the present invention uses a rectangular sensor having a width narrower than the projected image width, and a height corresponding to the height of the projected image. To expose an entire film frame image to the sensor, the lens moves the projected image across the sensor at a predetermined rate sufficient to allow the sensor to capture each component of the image. The lens may be moved along an axis parallel to the width of the film frame to move the projected image across the sensor. The present invention thereby scans film images using a sensor substantially smaller than the projected image size, and can scan a variety of film formats without moving or changing the size of the sensor.

DETAILED DESCRIPTION OF THE INVENTION

The present invention is directed to a method and apparatus for scanning an image. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 1:
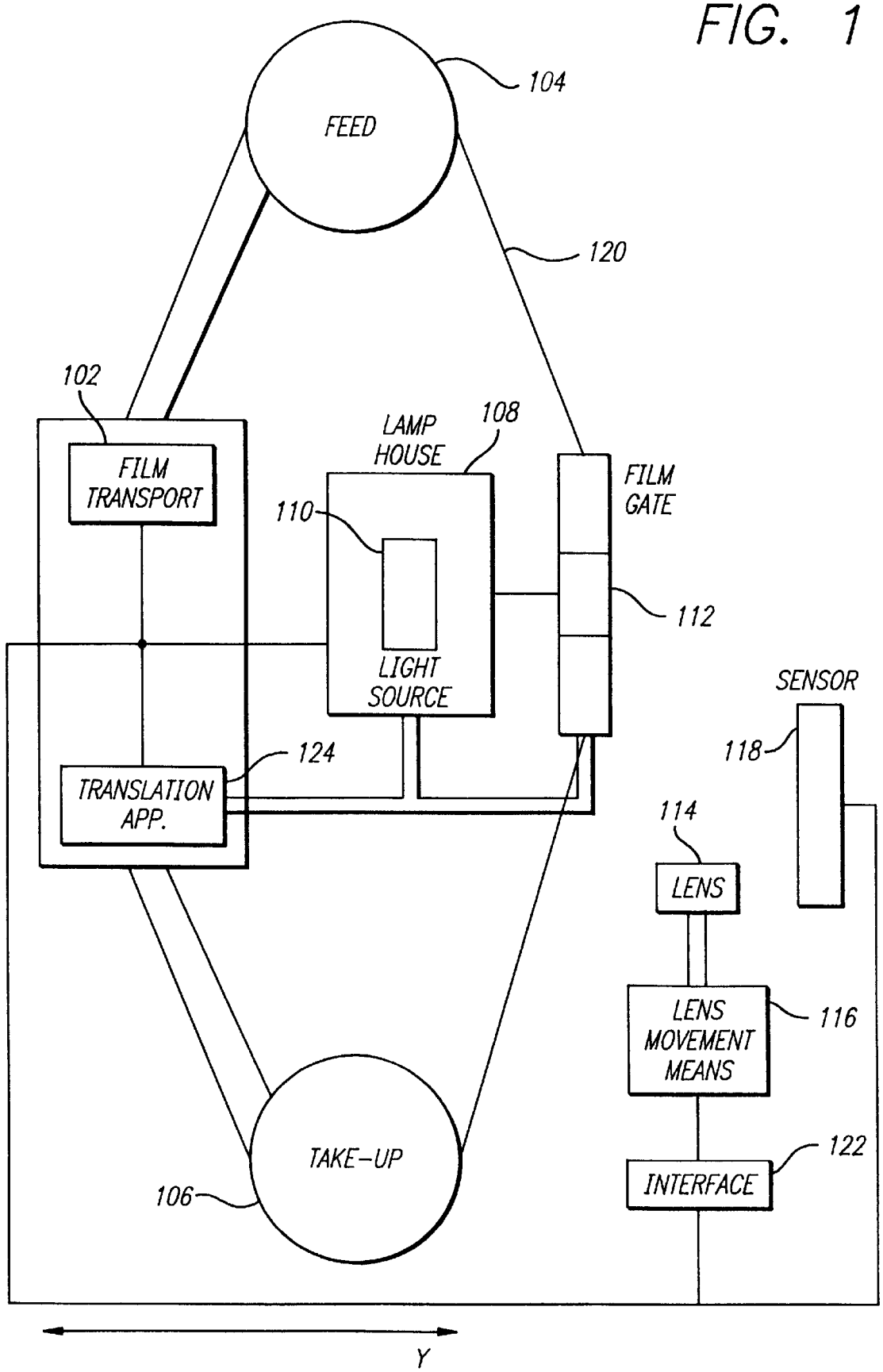
FIG. 1 is a block diagram of the preferred embodiment moving lens film scanner.

FIG. 1 illustrates a preferred embodiment of the present invention. The invention can be used to scan a wide variety of images stored on a semi-transparent medium, for example, single negatives and films of varying sizes. The present invention can be used to convert images into digital or analog signals. These signals may comprise electronic or optical signals. The preferred embodiment shown in FIG. 1 is directed to digitizing motion picture film. Film transport 102 transports film 120 between film feed 104 and take-up 106. The film frame remains still during the scanning of the frame. Lamp house 108 contains light source 110 to illuminate film frames held by film gate 112. Light from light source 110 passes through the film frame held by film gate 112, and thereby forms a projected image. The projected image then passes through lens 114. Lens 114 can be moved as discussed below. Lens movement means 116 controls the movement of lens 114. After the projected image passes through lens 114, it exposes sensor 118. Sensor 118 converts the projected image into signals. Element 124 is a translation apparatus for moving film gate 112 and lamp house 108 relative to lens 114. Film scanner interface 122 coordinates the functions of film transport 102, light source 110, lens movement means 116, translation apparatus 124, and sensor 118. Film scanner interface 122 includes at least a microprocessor to control and monitor the film scanner components, and a storage medium, such as a hard disk drive, to store the image data generated by sensor 118. Sensor 118 signals film scanner interface 122 when sensor 118 saturates. The manner in which and the means with which the signals from sensor 118 are processed fall beyond the scope of the present invention and are therefore not discussed. Approaches to the transfer and processing of sensor output signals are discussed in co-pending patent application Ser. No. 08/710,112 filed Sep. 12, 1996 and entitled METHOD AND APPARATUS FOR A FILM SCANNER INTERFACE, assigned to the assignee of the present invention and incorporated herein by reference.

Figure 3:
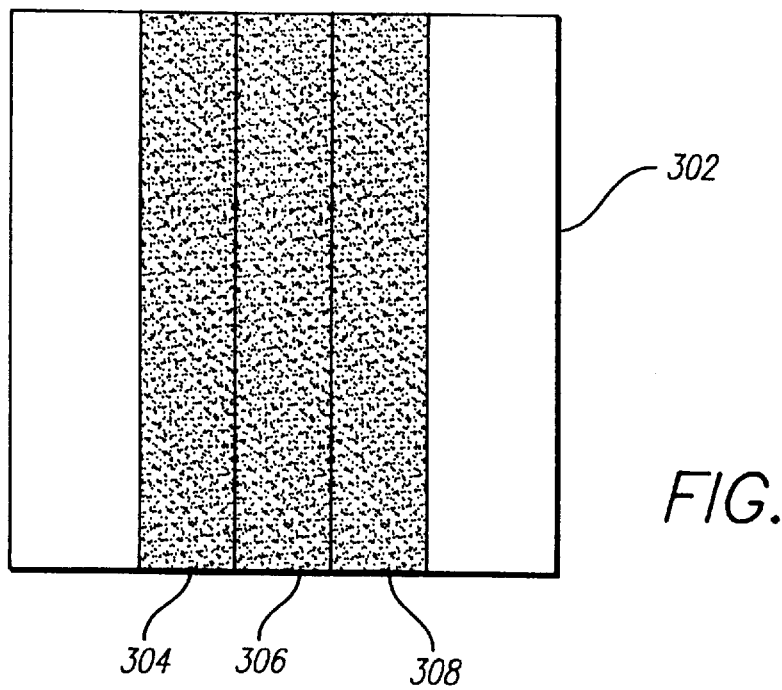
FIG. 3 shows two orientations of the preferred embodiment sensor for moving lens film scanners in accordance with the invention.

In the preferred embodiment film transport 102 is a Bell & Howell style shuttle mechanism as may be used in the motion picture industry. The shuttle mechanism and film gate 112 can accommodate a variety of film formats including, for example, the following: 35 mm Vistavision (eight perforations), 35 mm Academy aperture (four perforations), and 65 mm frames. The preferred embodiment light source 110 is a continuous wave halogen lamp, other film scanner light sources may also be used. In addition to continuous wave light sources, a stroboscopic light source may also be used, as is described in co-pending patent application, Ser. No. 08/651,164 filed May 17, 1996 and entitled METHOD AND APPARATUS FOR DIGITIZING FILMS USING A STROBOSCOPIC SCANNING SYSTEM, assigned to the assignee of the present invention and incorporated herein by reference. In the preferred embodiment, sensor 118 is a tri-linear array charge coupled device image sensor, as shown in FIG. 3. The tri-linear array sensor has three separate, filtered, light sensing columns, 304, 306, and 308 whose width is substantially smaller than the width of the projected image. This requires the projected image to be moved, relative to sensor 118, to expose the entire projected image to sensor 118. Other sizes and types of solid state sensors may also be used as is known by those of ordinary skill in the art.

Using a line-array sensor, rather than a full projected image size two dimensional array sensor, greatly reduces the engineering costs required to design film scanners. Also, the smaller size of the line-array sensors makes them less expensive than full size array sensors. Sensor 118 may comprise a single line of pixels, or may be a plurality of pixels wide. The size of the sensor depends on the size of the individual pixels. One alternative embodiment, for example, uses an approximately 7 micron wide line-array sensor. As is discussed below, moving film gate 112 along an axis perpendicular to the plane of film gate 112 allows a range of scanner sizes to be used including 2 k, 4 k, 8 k, or any arbitrary size outside or between these basic resolutions.

To scan a film frame using a line-array sensor, lens 114 moves the projected image across sensor 118. In the preferred embodiment, the height of the projected image at the sensor matches the height of the sensor. Therefore, to expose line-array sensor 118 to the entire projected image requires only that the projected image move perpendicular to the line-array sensor. In the preferred embodiment, lens 114 moves along an axis parallel to the plane of film gate 112, and perpendicular to the Y axis shown in FIG. 1. Moving lens 114 in this manner moves the projected image across the vertical face of sensor 118, and thereby exposes sensor 118 to the entire projected image, one line at a time.

In one embodiment, a cam connected to lens 114 via a spring mounted base is used to move lens 114. A motor rotates the cam, causing lens 114 to make a full cycle of movement with each complete rotation of the cam. The horizontal scanning movement of lens 114 allows sensor 118 to only have to cover the, generally shorter, vertical axis of the film frame. In the preferred embodiment, lens 114 exposes the sensor to a full frame in each direction of its motion. Scanning images during both directions of the lens movement maximizes efficiency by avoiding having the sensor wait for the lens to return. In an alternative embodiment, an image may be scanned as the lens moves in one direction only, with a wait period following each scan for the lens to return to the start position. The scanning speed is generally limited by the speed of the sensor. To obtain full resolution from a sensor requires that the sensor be exposed to a threshold number of photons.

In the preferred embodiment, a tri-linear sensor is used, as shown in FIG. 3. A tri-linear sensor is a sensor with three linear sensor component sections. The preferred embodiment tri-linear sensor has separate linear components for red, green and blue. Each sensor color component section is comprised of a column of pixels. The columns may be as narrow as one pixel, or preferably many pixels wide but still substantially narrower than the projected image. Other forms of sensors may also be used with regions of the sensor dedicated to detecting light waves within predetermined regions of the electromagnetic spectrum. Sensors may also be used having more than three sensor color component sections.

In the preferred embodiment, lens movement means 116 moves lens 114, which moves the projected image across sensor 118. Therefore, red is exposed to the image first, followed by green, followed by blue. The blue component of sensor 118 generally takes the longest to saturate, and is sometimes the limiting factor on the speed that the projected image can be moved across sensor 118. This is caused by the lower percentage of light that passes through the blue light source filter than for example, red or green filters.

Several approaches can be used to compensate for the lower efficiency of the blue filter. For example, in the preferred embodiment, lens 114 is moved at a sufficiently slow speed to saturate sensor 118 with the blue component light source in a single pass. Alternatively, lens 114 can be moved at a faster speed, for example, at a speed so that the red component light source saturates sensor 118 during one pass of lens 114. Multiple passes of lens 114 are then required to saturate sensor 118 with the blue component light source. The total exposure time is shorter for the faster lens speed embodiment. An advantage of using a multiple pass technique is that lens 114 may be moved at the same rate for all of the color components. Another alternative approach is to move lens 114 at a faster speed initially, and then at a slower speed for the subsequent passes required to saturate sensor 118 with the less efficient light source components. In the multiple pass embodiments sensor 118 collects image data incrementally. For example, sensor 118 may obtain a single bit per pixel of the projected image for each lens 114 pass. With each additional pass sensor 118 acquires another bit of resolution, until sensor 118 saturates.

The scanner of the present invention can scan different size films without changing the sensor size. To adapt the scanning system to a different film size, film gate 112 can be moved along the Y axis as designated in FIG. 1. Moving film gate 112 along the Y axis changes the size of the projected image at the projected image plane of sensor 108. This type of adjustment can be used to maintain a projected image size that matches the height of the sensor when the film size is changed. Lamp house 108 may also be moved with film gate 112. Film gate 112 and lamp house 108 may be moved manually or a motor and control system may be used, as is well known by those of ordinary skill in the art. Moving lamp house 108 and film gate 112 in this manner allows the scanner to accommodate a wide range of different film formats including 35 mm Academy, Vistavision, and 65 mm formats. Alternatively, where lens 114 is a magnifying lens, oriented so that the magnified projected image is the output, moving lens 114 away from sensor 118 increases the size of the projected image at sensor 118.

Figure 4:
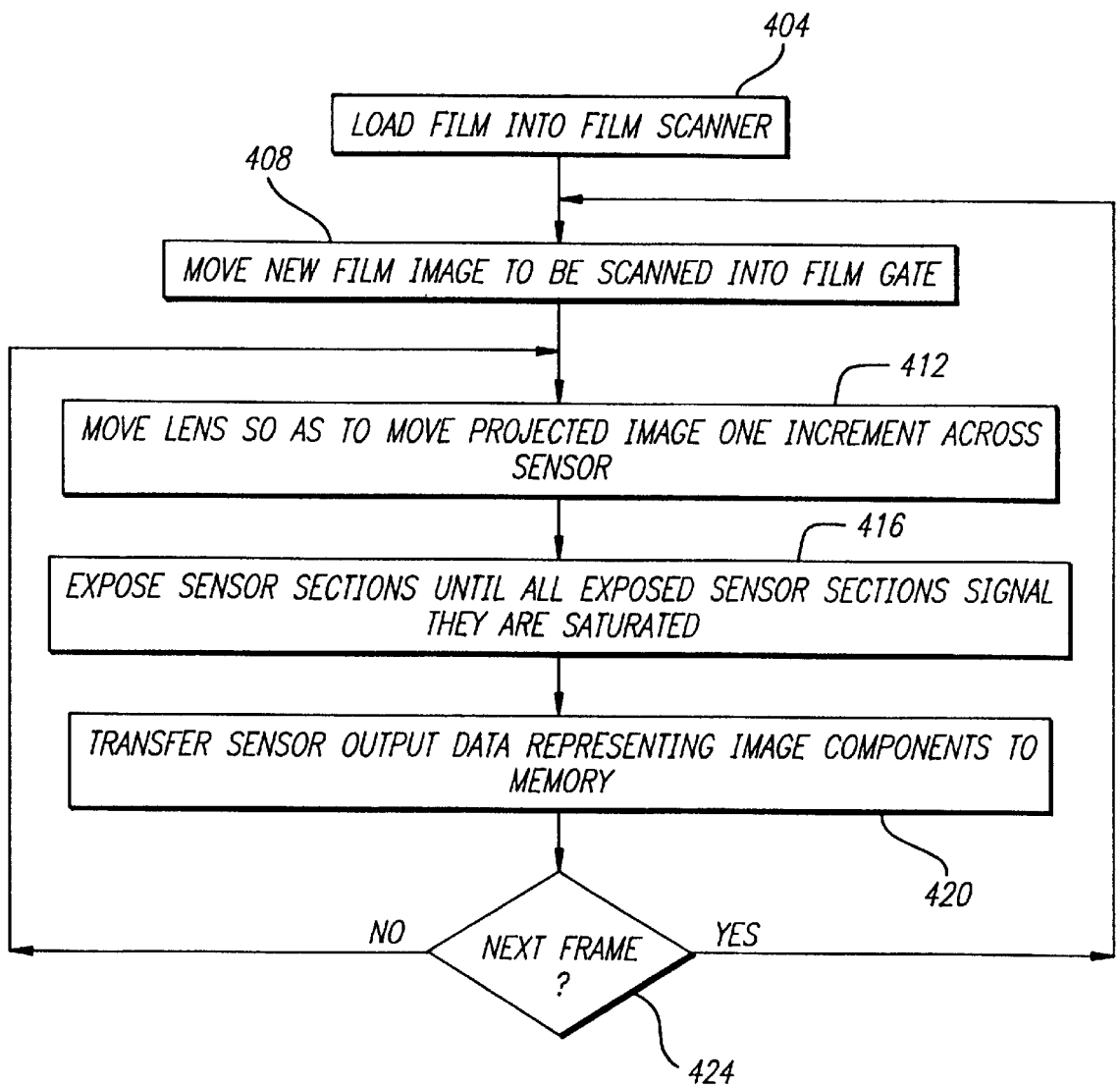
FIG. 4 is a flow chart of the preferred embodiment scanning process for a moving lens film scanner with a sensor having a plurality of color component sections in accordance with the invention.

FIG. 4 is a flow diagram of a scanning process for the preferred embodiment of a scanner with a sensor having a plurality of line-array color component sections, as shown, for example in FIG. 3. First the images to be scanned are loaded into the scanner. The scanner may then adjust the position of film gate 112 to a predetermined position based on the film format to adjust the projected image size to match the height of sensor 118. The film transport 102 then moves the film to the first frame to be scanned. The scanner moves lens 114 to align the edge of the projected image with the edge of the sensor surface of sensor 118. Next lens 114 moves a predetermined increment to move the projected image across sensor 118. Alternatively, the projected image can scan multiple times past each sensor array to saturate sensor 118. In the preferred embodiment, lens 114 moves the projected image a distance equal to the width of a sensor column, for example sensor column 304. At step 416, sensor 118 absorbs light from light source 110. The image components thereby expose sensor color component sections 304, 306, and 308, until sensor 118 signals that all the sensor color component sections are saturated. A sensor color component section reaches saturation when the sensor has fully absorbed the projected image so that increasing the exposure time will not affect the sensor output signals.

At step 420, sensor 118 transfers sensor output data to memory. This data represents the projected image components exposed to the sensor color component sections. At test 424, the system checks whether the entire film frame has been scanned across sensor 118. If the entire film frame has been scanned then the system moves a new film frame into film gate 112, and the process continues with step 412. If only part of the film frame has been scanned then the system moves lens 114 to move the projected image a distance equal to the width of a sensor column, and the process continues at step 416.

In another embodiment a black and white sensor is used. Filters are used with a white light source to obtain red, green and blue image components. Alternatively, separate red, green, and blue light sources may be used. In one black and white sensor embodiment, the system moves the projected image across the sensor once for each of the color component sections. For example, the red filter may be placed on the light source and lens 114 moved so as to scan the projected image across the sensor. A green filter then replaces the red filter and the projected image is again scanned across the sensor. Finally, a blue filter replaces the green filter, and the projected image makes a third and final scan across the sensor. This cycle is then repeated for each frame image. A black and white sensor embodiment can, for example, scan film at a rate of approximately four seconds per frame, where the sensor chip is running at 20 MHz. In an alternative black and white sensor embodiment, a stroboscopic light source, with red, green and blue light sources in it, is used. The tri-linear embodiments have the advantage that red, green, and blue image components can be exposed nearly simultaneously, whereas with the black and white sensor embodiments, the color components are exposed in sequential form. Therefore, where comparable components are used, the tri-linear sensor embodiments are faster than the black and white sensor embodiments.

Figure 2:
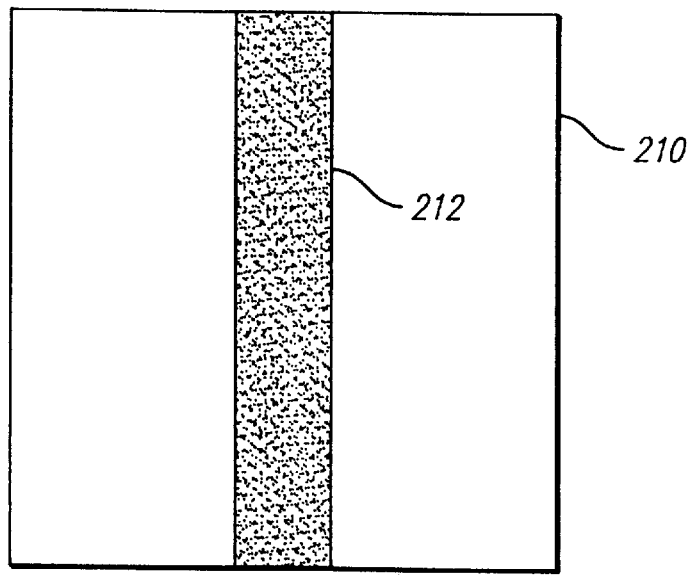
FIG. 2 shows two orientations of a sensor for moving lens film scanners in accordance with the invention.
Figure 5:
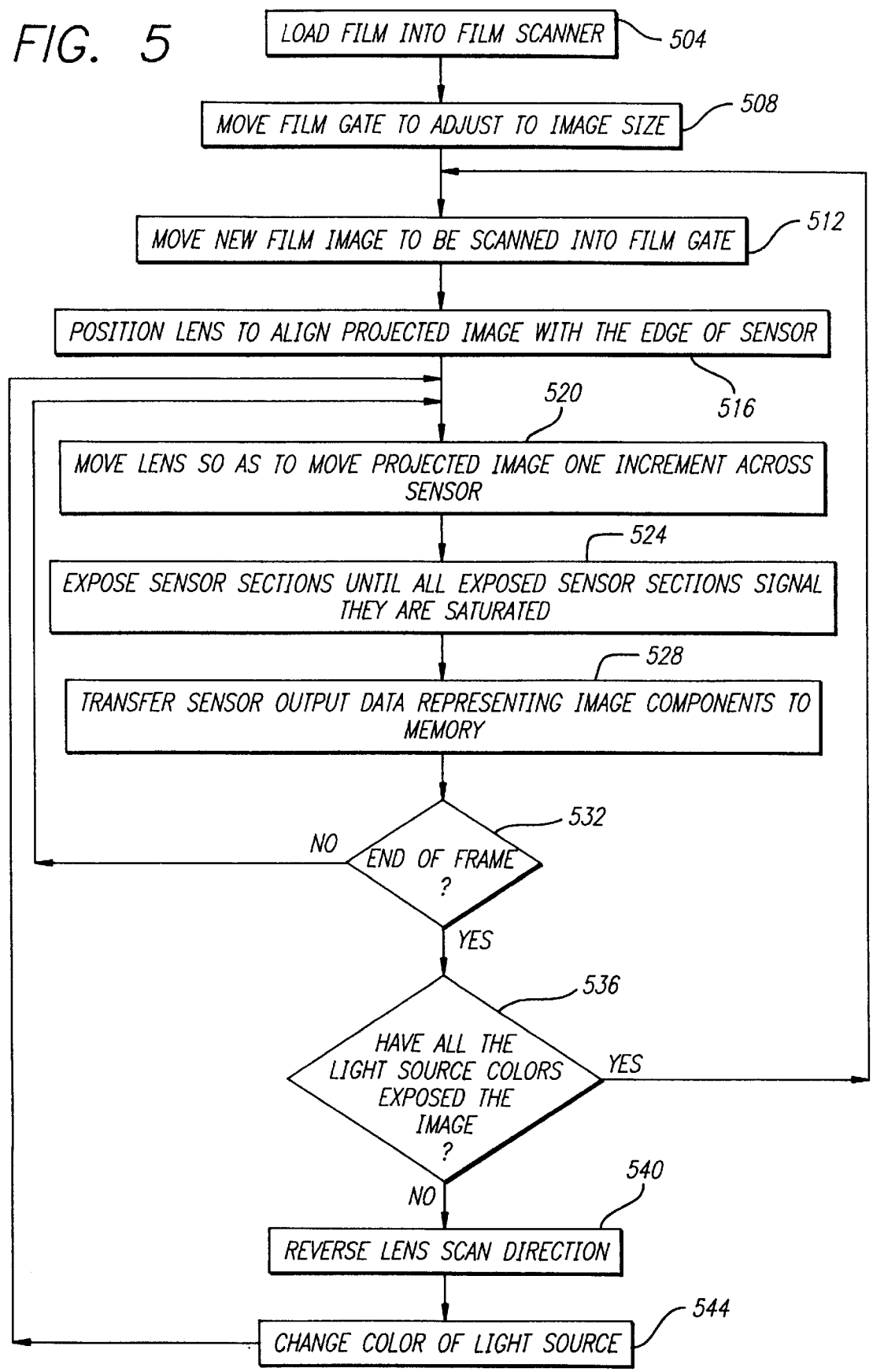
FIG. 5 is a flow chart of a scanning process for a moving lens film scanner with a black and white sensor in accordance with the invention.

FIG. 5 is a flow diagram of a scanning process for a scanning system with a black and white sensor, of the form shown for example in FIG. 2, with a light sensitive sensor surface 212. First the images to be scanned are loaded into the scanner. The scanner may then adjust the position of film gate 112 to a predetermined position based on the film format, to match the projected image size to the height of sensor 118. The scanner then moves the film to the first frame to be scanned. The scanner then moves lens 114 to align the edge of the projected image with the edge of sensor surface 212. Next lens 114 moves a predetermined increment to move the projected image across sensor 118. This exposes sensor surface 212 to the next adjacent component of the projected image equal in size to sensor surface 212. At step 524, sensor 118 absorbs light from light source 110. The projected image component thereby exposes sensor 118 until sensor 118 signals it is saturated. At step 528, sensor 118 transfers sensor output data to memory, for example, in film scanner interface 122. At test 532, the system checks whether the entire frame has been scanned. If the entire frame has been scanned then at test 536, the system checks whether the image has been exposed with all of the colored light sources. For example, light source 110 may comprise a red light source, a green light source, and a blue light source. If the film frame has been exposed to all the light sources then the film moves to place a new image in film gate 112, and the process continues at step 512. If there are light sources that have not yet exposed the film frame then the direction of the lens scanning movement is reversed, and a new light source exposes the film frame image. The scanning process then continues at step 520.

Scanners that use a moving lens to move projected images across a sensor have several advantages over scanners that use moving mirrors to scan projected images. With a moving mirror, the mirror deflects the projected image, and changes its optical path. This introduces critical radiosity constraints. By contrast, with a moving lens, there is no angular deflection of the projected image, the projected image movement simply tracks the lens movement. The moving lens approach thereby avoids the radiosity constraints. The greater precision with which the mirror must be moved, makes the moving mirror scanning systems require a more complex drive electronics and control system. Also, the moving lens approach uses light more efficiently because it avoids the loss of light caused by deflecting projected images with a mirror.

Lens movement means 116 may take a variety of forms. In one embodiment the motor and cam driver apparatus described above which drives the scanning motion of lens 114 can be mounted on a track oriented along the Y axis as defined in FIG. 1. A variety of alternative lens movement means can also be used, for example, linear clutch mechanisms with DC motors, single axis air bearing slides, or lead screws could be incorporated into the design.

In an alternative embodiment of the present film scanner invention, film gate 112 moves as described above to accommodate different size film formats, however, lens 114 does not move to scan projected images across sensor 118. In this embodiment, a full size array sensor may be used that is the same size as the projected image. Alternatively, a moving mirror system may be used to scan projected images across sensor 118, as is known by those of ordinary skill in the art. An example of a scanner that uses a moving mirror system to scan projected images across a sensor is described in U.S. Pat. No. 4,330,793, entitled "ELECTRONIC SCANNING OF SUPER-8 FILMS FOR REPRODUCTION ON A T.V. VIEWING UNIT." The tilting mirror system is very similar to that used in galvanometric systems, although slight structural modifications may be necessary with regard to the magnetic system thereof. Such systems provide the precise controllability of deflection required by the scanner.

Thus, a method and apparatus for scanning an image using a moving lens scanner have been provided. Although the present invention has been described with respect to certain specific embodiments, it will be clear to those skilled in the art that the inventive features of the present invention are applicable to other embodiments as well, all of which are intended to fall within the scope of the present invention.

I claim:

1. An apparatus for scanning film images comprising:
   film transport means for moving film at a controlled speed;
   a lens;
   a sensor for converting projected images into signals;
   said sensor having a sensor surface;
   said sensor converting light that strikes said sensor surface into signals;
   a light source for projecting an image through said lens;
   said lens positioned between said light source and said sensor;
   lens movement means for moving said lens relative to said sensor in a plane substantially parallel to said sensor surface so as to move a projected image across said sensor surface;
   said lens mechanically coupled to said lens movement means.

2. The apparatus of claim 1 wherein said lens moves along an axis substantially parallel to said sensor surface and substantially perpendicular to a direction of film movement.

3. The apparatus of claim 2 wherein said sensor is a black and white sensor;
   said black and white sensor comprises at least one column;
   each of said at least one column comprises a plurality of sensing elements.

4. The apparatus of claim 2 wherein said sensor comprises a plurality of columns;
   each of said columns comprises a plurality of sensing elements;
   at least one of said columns comprises a plurality of sensing elements for detecting light waves within a first predetermined region of the electromagnetic spectrum;

at least one of said columns comprises a plurality of sensing elements for detecting light waves within a second predetermined region of the electromagnetic spectrum.

5. The apparatus of claim 4 wherein said light source comprises a stroboscopic light source.

6. A method for scanning film images comprising the steps of:

moving film at a controlled speed through a film gate using a film transport means;

projecting an image from the film through a lens and onto a sensor surface of a sensor;

moving said lens relative to said sensor in a plane substantially parallel to said sensor surface so as to move projected images across said sensor surface;

converting components of the projected image detected at said sensor into signals;

repeating said lens movement and converting steps to scan an amount of film.

7. The method of claim 6 wherein said step of moving said lens comprises moving said lens along an axis substantially parallel to said sensor surface and substantially perpendicular to a direction of film movement.

8. The method of claim 7 wherein said step of converting components of the projected image into signals comprises using separate sections of said sensor to separately convert individual color components of adjacent sections of the projected image into signals.

9. The method of claim 8 wherein said step of projecting an image comprises strobing a light source for a predetermined length of time.

10. An apparatus for scanning film images comprising:

film transport means for moving film at a controlled speed;

a film gate for holding film frames;

a lens;

a sensor for converting projected images into signals;

said sensor having a sensor surface;

a light source for projecting an image through said lens;

said lens positioned between said light source and said sensor;

a translator apparatus for moving said film gate to change a distance between said film gate and said sensor;

said film gate mechanically coupled to said translator apparatus.

11. The apparatus of claim 10 further comprising;

lens movement means for moving said lens so as to move a projected image across said sensor surface;

said lens mechanically coupled to said lens movement means.

12. The apparatus of claim 11 wherein said sensor is a black and white sensor;

said black and white sensor comprises at least one column;

each of said at least one column comprises a plurality of sensing elements.

13. The apparatus of claim 12 wherein said sensor comprises a plurality of columns;

each of said columns comprises a plurality of sensing elements;

at least one of said columns comprises a plurality of sensing elements for detecting radiation within a first predetermined region of the electromagnetic spectrum;

at least one of said columns comprises a plurality of sensing elements for detecting radiation within a second predetermined region of the electromagnetic spectrum.

14. The apparatus of claim 13 wherein said light source comprises a stroboscopic light source.

15. A method for scanning film images comprising the steps of:

moving film at a controlled speed through a film gate using a film transport means;

projecting an image from the film through a lens and onto a sensor surface of a sensor;

adjusting a position of said film gate relative to said sensor to adjust the size of a projected image at said sensor;

moving said lens relative to said sensor in a plane substantially parallel to said sensor surface so as to move projected images across said sensor surface;

converting components of the projected image detected at said sensor into signals;

repeating said lens movement and converting steps to scan an amount of film.

16. The method of claim 15 wherein said step of moving said lens, comprises moving said lens along an axis substantially parallel to said sensor surface and substantially perpendicular to the direction of film movement.

17. The method of claim 16 wherein said step of converting components of the projected image into signals comprises using separate sections of said sensor to separately convert individual color components of adjacent sections of the projected image into signals.

18. The method of claim 17 wherein said step of projecting an image comprises strobing a light source for a predetermined length of time.

* * * * *